(12) United States Patent
Tsuchiya

(10) Patent No.: US 7,452,118 B2
(45) Date of Patent: Nov. 18, 2008

(54) AREA LIGHT SOURCE

(75) Inventor: Kenshi Tsuchiya, Saitama-ken (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 99 days.

(21) Appl. No.: 11/391,323

(22) Filed: Mar. 29, 2006

(65) Prior Publication Data

US 2006/0238367 A1 Oct. 26, 2006

(30) Foreign Application Priority Data

Apr. 21, 2005 (JP) .............................. 2005-124101

(51) Int. Cl.
*F21V 7/04* (2006.01)

(52) U.S. Cl. ........................ 362/608; 362/600; 362/606; 362/607; 362/611; 362/612; 362/613; 362/615; 362/620; 362/610; 362/621; 362/555; 362/561

(58) Field of Classification Search .................... None
See application file for complete search history.

(56) References Cited

U.S. PATENT DOCUMENTS

| | | | | |
|---|---|---|---|---|
| 5,709,447 A | * | 1/1998 | Murakami et al. | 362/621 |
| 5,999,685 A | * | 12/1999 | Goto et al. | 385/146 |
| 6,976,779 B2 | * | 12/2005 | Ohtsuki et al. | 362/608 |
| 7,217,025 B2 | * | 5/2007 | Kim et al. | 362/610 |
| 2003/0076669 A1 | * | 4/2003 | Itoh et al. | 362/31 |
| 2004/0125590 A1 | * | 7/2004 | Tsai | 362/31 |

FOREIGN PATENT DOCUMENTS

JP 2003-132722 5/2003

* cited by examiner

*Primary Examiner*—Sandra O'Shea
*Assistant Examiner*—Danielle Dunn
(74) *Attorney, Agent, or Firm*—Oblon, Spivak, McClelland, Maier & Neustadt, P.C.

(57) ABSTRACT

Area light source 10 used for LCD device 1 includes light guide 12 and LED devices 18 and 19 disposed at a side portion of light guide 12. A light receiving portion at a side edge portion of light guide 12 is provided with prisms 24 and 25 of saw-tooth prism group 22. Apex angles of prisms 24 and 25 are set to be more acute up to the middle point of prisms 24 and 25 as prisms 24 and 25 are farther from LED devices 18 and 19, respectively.

8 Claims, 6 Drawing Sheets

AREA LIGHT SOURCE

CROSS-REFERENCE OF RELATED APPLICATIONS

This application is based upon and claims the benefit of priority from the prior Japanese Patent Application No. 2005-124101, filed on Apr. 21, 2005, the entire contents of which are incorporated herein by reference.

FIELD OF THE INVENTION

This invention generally relates to an area light source applied to a flat panel display device such as a liquid crystal display device and, more particularly, to an area light source using a light emitting diode.

BACKGROUND OF THE INVENTION

A side light type area light source is often applied to a liquid crystal display (LCD) device because such a side light type area light source is suitable for an LCD device with a technical feature of particularly thin thickness. The side light type area light source includes a light guide, a cold-cathode fluorescent tube and an optical sheet. The cold-cathode fluorescent tube is set on a side of the light guide, light emitting from the cold-cathode tube is applied to a light incident surface provided on the side of the light guide, and the light applied is converted into area light through the optical sheet such as a reflective sheet.

Since light emitting diode (LED) devices has been recently improved significantly in efficiency, so that the LED devices are now comparable to cold-cathode tubes, such LED devices are used for light sources of mobile phones. As disclosed in Japanese Unexamined Patent Publication No. 2003-132722, a saw-tooth prism group is provided at a side portion of a light guide and LED devices are arranged at a side portion of the prism group so that resultant light from point light sources of the LED devices can become area light efficiently.

The saw-tooth prism of the area light source set forth above can convert the light from the LED devices into the area light efficiently. The area light source, however, has a problem that the LED devices are locally high in brightness in their vicinities. As a result, uneven brightness is observed on an LCD device provided with the area light source.

The present invention provides an area light source with the suppression of uneven brightness in the case that point light sources of LED devices are arranged along a side of a light guide.

SUMMARY OF THE INVENTION

An area light source is provided with a light guide, first and second prisms, and first and second light emitting diode devices. The light guide has a light receiving portion while the first and second prisms are provided at the light receiving portion of the light guide. The first and second light emitting diode devices are provided to correspond to the first and second prisms, respectively, and face the light receiving portion of the light guide at a predetermined distance. Apex angles of the first and second prisms change up to a boarder in the light receiving portion of the light guide between the first and second light emitting diodes.

According to the present invention, an apex angle of each prism in a prism group changes in accordance with a distance from an LED device to reduce uneven brightness with the avoidance of a locally high brightness distribution in a vicinity of the LED device.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein.

DETAILED DESCRIPTION OF THE INVENTION

Figure 1:
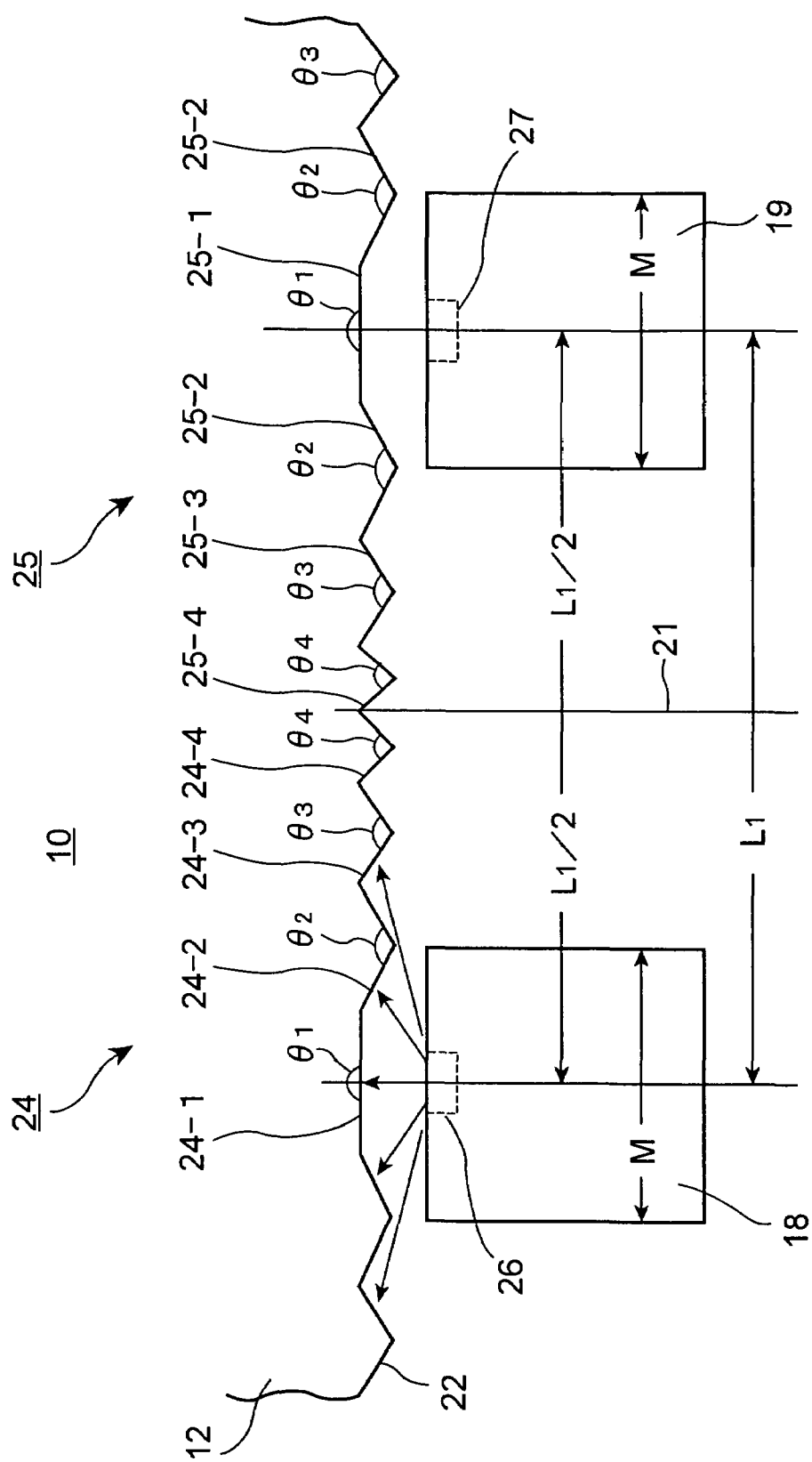
FIG. 1 is a plan view of an arrangement for a light guide and LED devices in accordance with a first embodiment of the present invention.

Embodiments of the present invention will be explained below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

First Embodiment

Area light source 10 of the first embodiment in accordance with the present invention will be described with reference to FIGS. 1-4 below.

(1) Structure of LCD device 1

Figure 3:
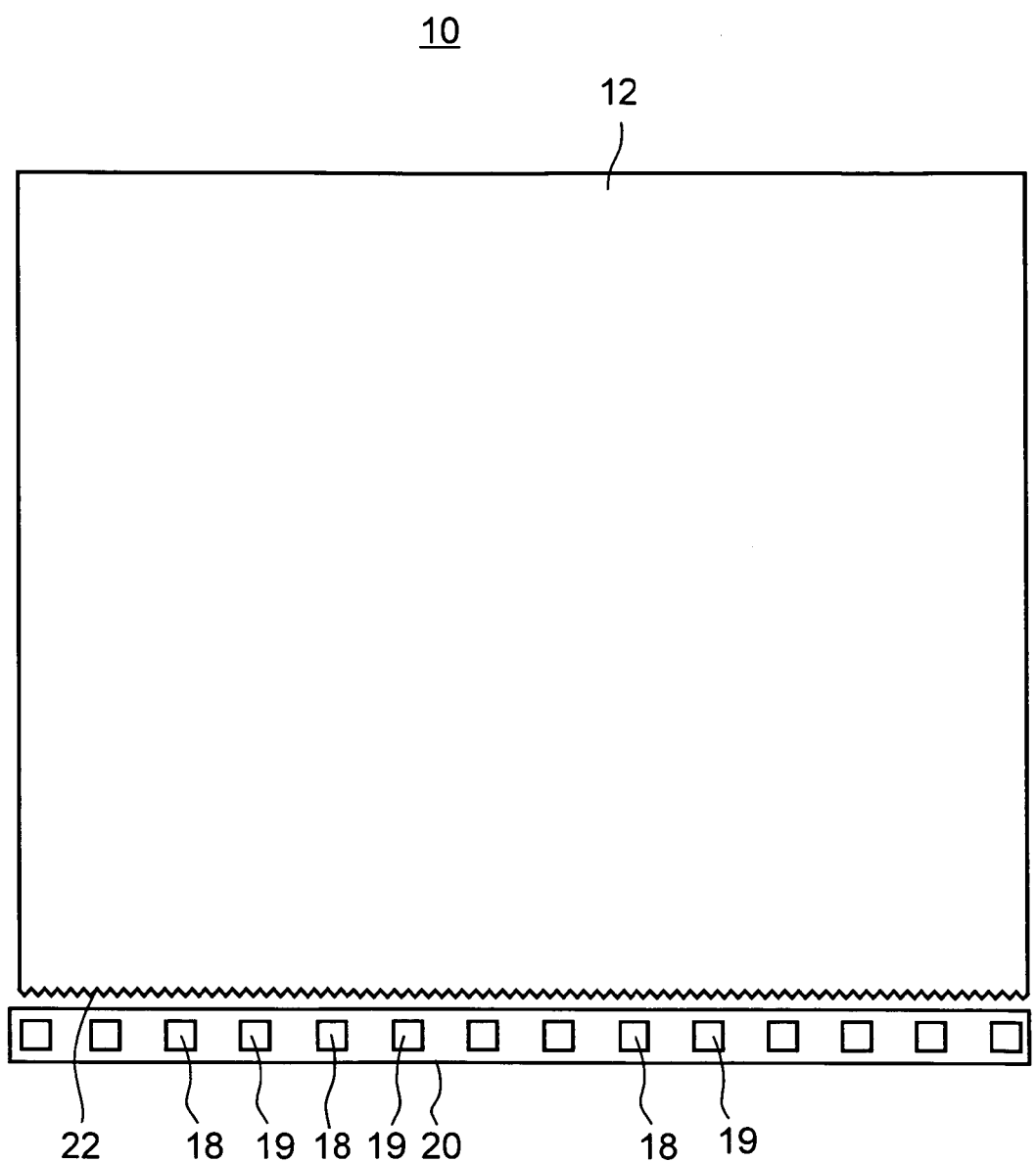
FIG. 3 is a plan view of an area light source to which the present invention is applied.
Figure 4:
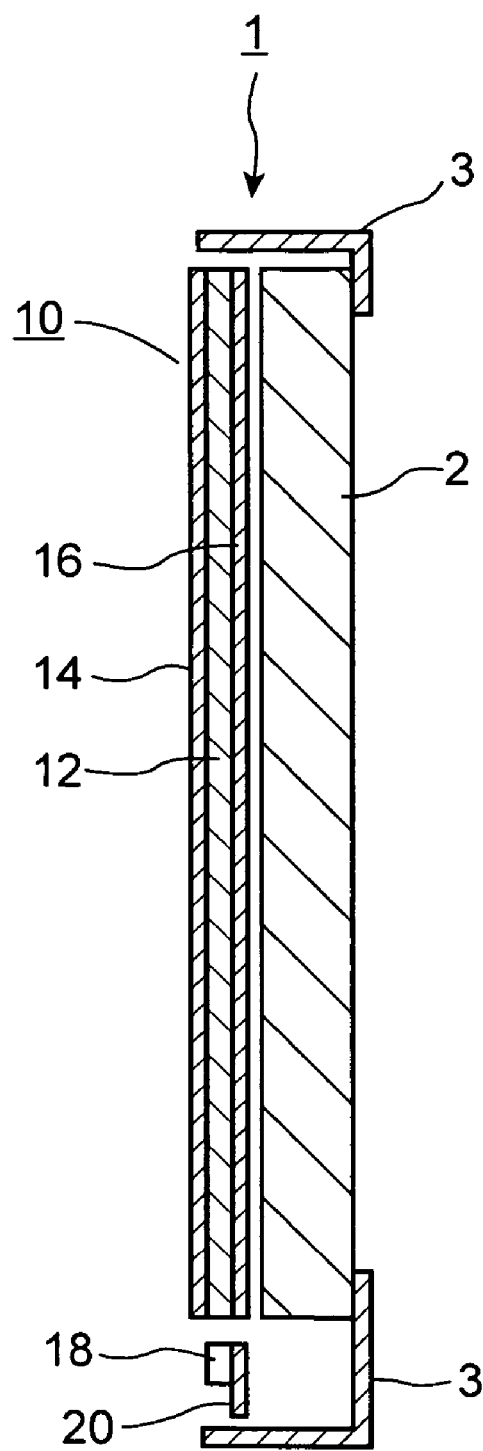
FIG. 4 is a sectional view of an LCD device to which the present invention is applied.

The structure of LCD device 1 provided with a first embodiment of area light source 10 will be set forth initially with reference to FIGS. 3 and 4.

As shown in FIG. 4, LCD device 1 includes area light source 10 disposed on a rear surface of liquid crystal cell 2, and area light source 10 and light guide 12 are put in metal cover 3. Liquid crystal cell 2 is connected to IC drivers and the like (not shown) through flexible printed board circuits. The IC drivers are used for a driving device to display images with liquid crystal cell 2.

Area light source 10 includes plate-like light guide 12, reflection plate 14 and prism sheet 16 provided on both rear and front surfaces of liquid crystal cell 2, respectively, and LED device 18 provided close to a side portion of light guide 12.

Light irradiated from LED device 18 is incident on the side portion of light guide 12 and is reflected toward a front surface side by reflection plate 14. Uniform light is then formed in prism sheet 16 so that area light is incident on the rear side of liquid crystal cell 2.

As shown in FIG. 3, LED devices 18 and 19 are set on wiring plate 20 at predetermined interval L1 (see FIG. 1). The total number of LED devices 18 and 19 is 40 or so for an LCD device with a diagonal 12.1' panel but it is determined by brightness required for a backlight unit.

(2) Structure of Light Guide 12

Next, light guide 12 is described with reference to FIGS. 1 and 2A-2B. The light receiving portion at a side edge portion of light guide 12 is provided with saw-tooth like prism group 22. Prism group 22 composed of linearly disposed triangular prisms 24 and 25 is projected from the side edge portion of light guide 12. Prisms 24 and 25 are arranged symmetrically with respect to central axis 21.

LED device 18 is disposed at a top portion of apex angles of prisms 24-1, 24-2, 24-3 and 24-4 (this arrangement is called the "basic position") while LED device 19 is disposed at the top of apex angles of prisms 25-1, 25-2, 25-3 and 25-4 (this arrangement is also called the "basic position").

Apex angle $\theta 1$ of prism 24-1 is 180°, i.e., $\theta 1=180°$. For the purpose of description in the application, such a prism as $\theta 1=180°$ is even called a triangle prism. Apex angles $\theta 2$, $\theta 3$ and $\theta 4$ of prisms 24-2, 24-3 and 24-4 are 120°, 110° and 90°, respectively. Likewise, Apex angles $\theta 1$, $\theta 2$, $\theta 3$ and $\theta 4$ of prisms 25-1, 25-2, 25-3 and 25-4 are 180°, 120°, 110° and 90°, respectively. In short, the apex angles $\theta 1$, $\theta 2$, $\theta 3$ and $\theta 4$ are determined as follows:

$$\theta 1=180°, \theta 2=120°, \theta 3=110° \text{ and } \theta 4=90°$$

As set forth above, the apex angles of prisms 24 and 25 gradually change in order to constitute prism group 22. Each of prisms 24 and 25 is of an equal depth except prisms 24-1 and 25-1.

(3) Effect of Prism Group

The effect of prism group 22 will be described below. Each of LED devices 18 and 19 measures 4 mm in width "M" by 0.8 mm in thickness, for instance. LED devices 18 and 19 are apart from each other by interval "L1" of 6.3 mm. Although each of LED devices 18 and 19 measures 4 mm in width, light emitting portions are part of LED devices 18 and 19, such as only central portions of LED devices 18 and 19, and each of LED devices 18 and 19 can be regarded as a point light source. Thus, LED devices 18 and 19 do not always emit light from the entire widths of 4 mm.

The thickness of light guide 12 may only correspond to that of each of LED devices 18 and 19, e.g., 0.8 mm. Meanwhile, since prisms 24 and 25 carry out substantially the same operation with respect to LED devices 18 and 19, respectively, only the operation of prism 24 will be described below with respect to LED device 18.

Figure 2A:
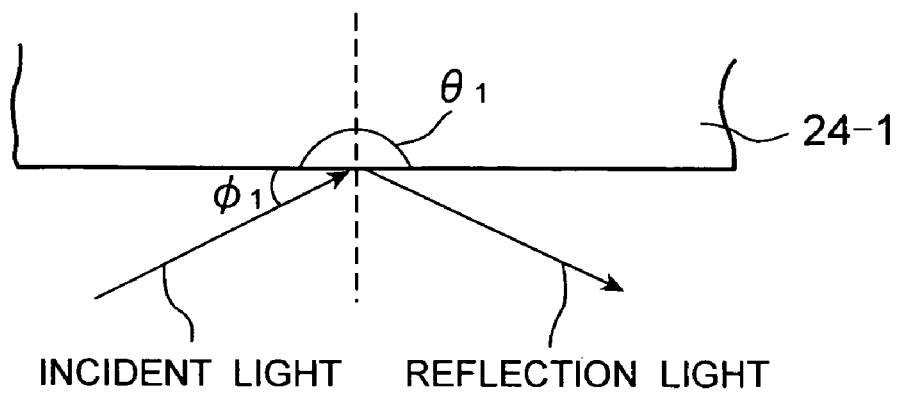
FIGS. 2A-2B show relationships between prisms and light.

As shown in FIG. 2A, prism 24-1 with apex angle $\theta 1=180°$ faces point light source 26 (FIG. 1) so that incident light perpendicular to prism 24-1 passes through prism 24-1 at a rate of about 100%. Since almost all slant incident light with incident angle $\Phi 1$, however, is reflected as shown in FIG. 2A in accordance with Snell's law, hardly any of the light is transmitted into light guide 12.

Figure 2B:
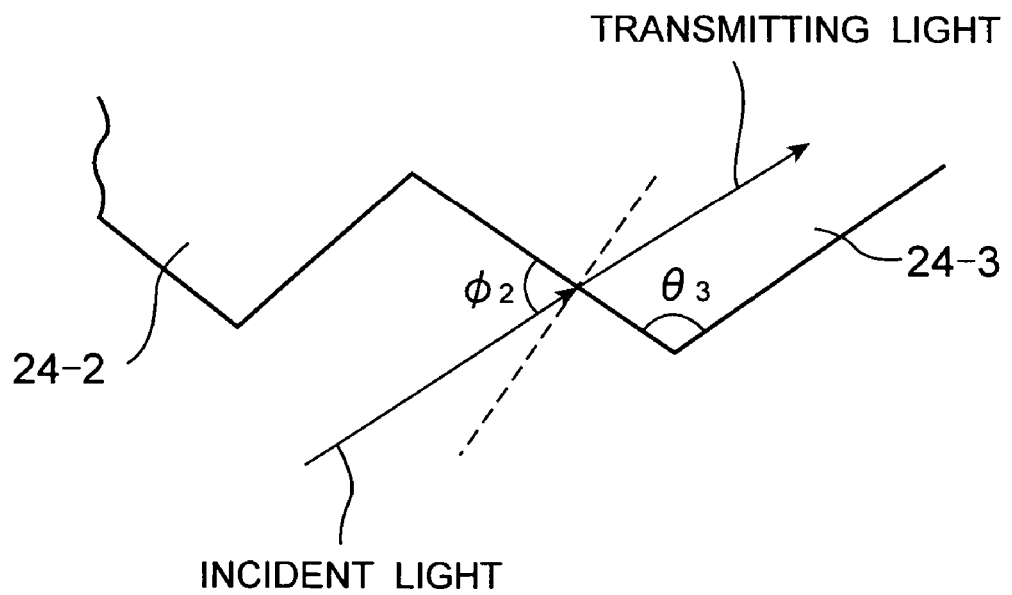

As shown in FIG. 2B, since prism 24-3 with apex angle $\theta 3=110°$ is away from point light source 26, light refraction and reflection occur in accordance with Snell's law. Prism 24-3 reflects nearly none of slant incident light with incident angle $\Phi 2$ so that almost all of the incident light enters into the interior of light guide 12.

If all the light receiving portion of a conventional light guide 12 is flat, incident light in the vicinity of point light source 26 is at an incident angle of about 90° so that almost all the incident light passes through the light receiving portion. As a result, brightness is high there. On the other hand, as a place is farther from LED device 18, an incident angle there becomes more acute so that incident light is hardly reflected. Thus, brightness is lower there.

Apex angles of prisms 24 and 25 of light guide 12 of this embodiment become more acute as places of prisms 24 and 25 are farther away from LED devices 18 and 19, respectively. Thus, brightness does not decrease even if places of prisms 24 and 25 are farther. Uniform brightness is provided for LCD device 1, accordingly.

Second Embodiment

Figure 5:
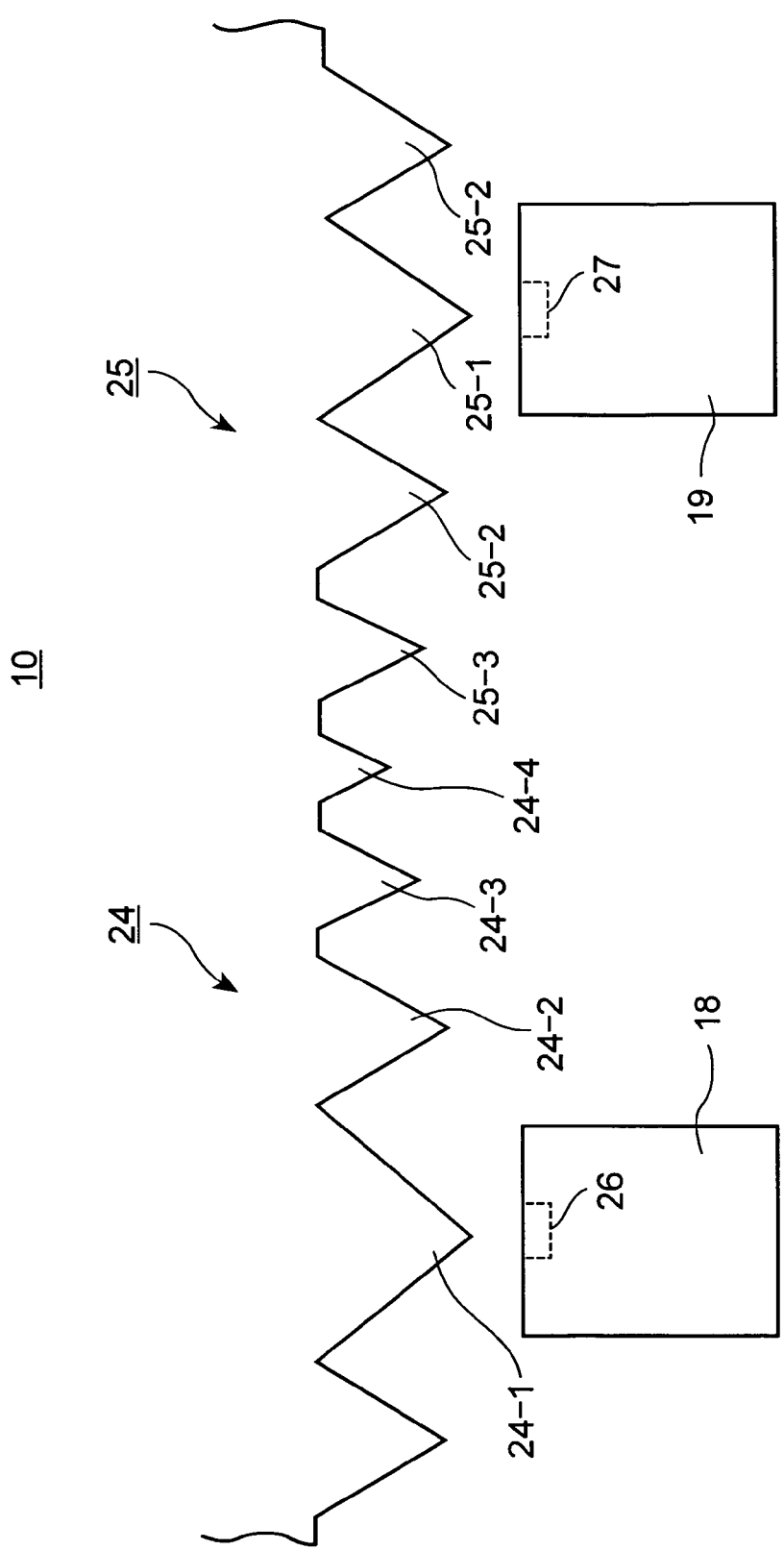
FIG. 5 is a plan view of an arrangement for a light guide and LED devices in accordance with a second embodiment of the present invention.

Area light source 10 of a second embodiment in accordance with the present invention will be described below with reference to FIG. 5. Prism 24-1 shown in FIG. 1 faces LED device 18 and has apex angle $\theta 1=180°$. Thus, almost all incident light irradiated from point light source 26 to prism 24-1 enters light guide 12.

If all the incident light, however, passes through prism 24-1, only its light receiving portion possibly increases brightness. In order to make use of reflection light there more effectively, apex angle $\theta 1$ of prism 24-1 is set to 80°, i.e., $\theta 1=80°$ as shown in FIG. 5. With this setting, all the incident light emitted from point light source 26 does not necessarily pass through prism 24-1 but the incident light is partially reflected. Likewise, apex angle $\theta 1$ of prism 25-1 is set to 80°. With this setting, all the incident light emitted from point light source 27 does not necessarily pass through prism 25-1 but the incident light is partially reflected. The direction of the incident light is slanted with respect to the incident surface of light guide 12 to decrease brightness there. Thus, uneven brightness can be reduced.

The depth of prism 24-1, 24-2, 24-3 or 24-4 is set to be shallower as a place of prism 24-1, 24-2, 24-3 or 24-4 is farther from LED device 18. Likewise, the depth of prism 25-1, 25-2, 25-3 or 25-4 is set to be shallower as a place of prism 25-1, 25-2, 25-3 or 25-4 is farther from LED device 19. As a result, light emitted from point light source 26 and 27 can easily reach such places as described immediately above to reduce uneven brightness.

A flat light receiving portion is provided between prisms 24 and 25 to further improve brightness distribution as a whole.

Third Embodiment

Apex angles of prisms 24 and 25 in the first and second embodiments are set to be more acute as places of prisms 24 and 25 are farther away from LED devices 18 and 19, respectively. As an alternative, apex angles of prisms 24 and 25 are set to be wider as places of prisms 24 and 25 are farther from LED devices 18 and 19, respectively.

Figure 6:
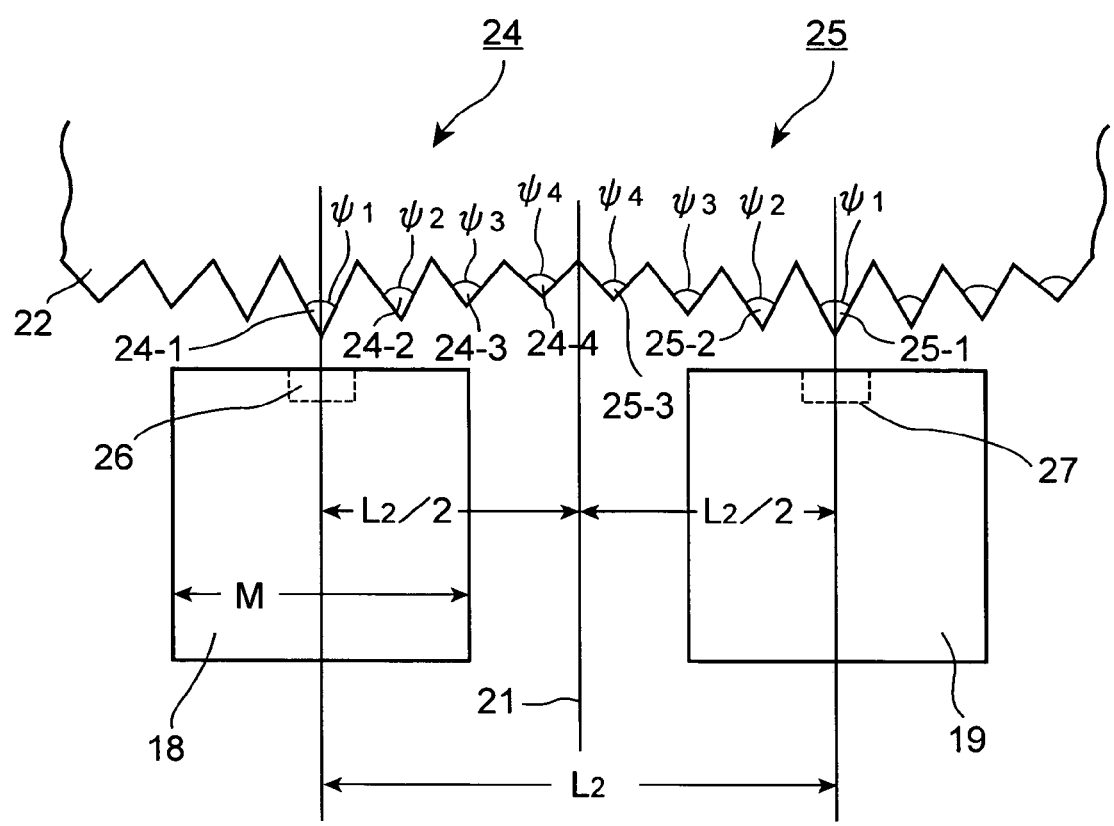
FIG. 6 is a plan view of an arrangement for a light guide and LED devices in accordance with a third embodiment of the present invention.

As shown in FIG. 6, where interval L2 between LED devices 18 and 19 is rather short and strong intensity light is incident on prisms 24 and 25, apex angles $\Psi 1$ of prisms 24-1 and 25-1 facing LED devices 18 and 19 are set to be acute, respectively. Thus, incident light on light guide 12 in front of light emitting portions of LED devices 18 and 19 is refracted to enter in a slant manner the incident surface of light guide 12. Apex angles $\Psi 2$, $\Psi 3$ and $\Psi 4$ of prisms 24-2, 24-3 and 24-4 and 25-2, 25-3 and 25-4 are set to be wider as places of prisms 24-2, 24-3 and 24-4 and 25-2, 25-3 and 25-4 are farther from LED devices 18 and 19, respectively. Such arrangements improve uniform brightness distributions.

Area light source of the first or second embodiment in accordance with the present invention is effective in the case that interval L1 between LED devices 18 and 19 is rather far. Area light source of the third embodiment in accordance with the present invention is effective, however, in the case that interval L2 between LED devices 18 and 19 is rather close.

The present invention is not limited to the embodiments but may be subjected to various modifications without departing from the scope of the invention defined in the attached claims.

The apex angles not only range from 70° through 180° in the embodiments but they may also range from 30° through 180°.

The present invention is useful for area light sources of flat panel display devices such as LCD devices and, in particular, is effective for LCD devices with larger screens not less than 6 inches in diagonal.

In the foregoing description, certain terms have been used for brevity, clearness and understanding, but no unnecessary limitations are to be implied therefrom beyond the requirements of the prior art, because such words are used for descriptive purposes herein and are intended to be broadly construed. Moreover, the embodiments of the improved construction illustrated and described herein are by way of example, and the scope of the invention is not limited to the exact details of construction. Having now described the invention, the construction, the operation and use of embodiments thereof, and the advantageous new and useful results obtained thereby, the new and useful construction, and reasonable equivalents thereof obvious to those skilled in the art, are set forth in the appended claims.

What is claimed is:

1. An area light source comprising:
    a light guide having a plurality of light receiving portions, each of the light receiving portions being arranged side-by-side along a longitudinal direction, a prism group arranged at an irradiation area of each of the light receiving portions, the prism group including a plurality of prisms, each of the prisms being arranged side-by-side along the longitudinal direction; and
    a plurality of light emitting diode devices, each of the light emitting diode devices being arranged so that an optical center axis of each the light emitting diode device corresponds to a center axis of each of the irradiation areas, the light emitting diode devices facing the irradiation areas at a predetermined distance,
    wherein an apex angle of each of the prisms in the prism group changes symmetrically to the center axis, in both directions away from the center axis, along the longitudinal direction of the irradiation area.

2. An area light source according to claim 1, wherein the apex angles of the prisms in the prism group decrease compared to the prisms that are farther from the optical center axis of the light emitting diode device.

3. An area light source according to claim 1, wherein the apex angles of the prisms in the prism group increase compared to the prisms that are farther from the optical axis of the light emitting diode device.

4. The area light source according to claim 1, wherein a flat surface is provided on the light receiving portion of the light guide at a location where the optical center axis of the emitting diode device intersects with the light receiving portion of the light guide.

5. An area light source according to claim 1, wherein the plurality of prisms are shallower in depth compared to the prisms that are farther in distance from the optical center axis of the light emitting diode devices.

6. An area light source according to claim 1, wherein the plurality of prisms are deeper in depth compared to the first and second prisms that are farther in distance from the optical center axis of the light emitting diode devices, respectively.

7. An area light source according to claim 1, wherein the optical center axis of one of the light emitting diode devices is centered with a top point of one of the plurality of prisms, respectively.

8. The area light source according to claim 1, wherein the apex angle of each center prism in the prism group is set at 180 degree as corresponding to each optical center axis of the light emitting diode devices, respectively.

* * * * *